United States Patent [19]

Urbutis

[11] Patent Number: 4,719,667
[45] Date of Patent: Jan. 19, 1988

[54] CLAMP MEANS FOR A STUFFING MACHINE

[75] Inventor: Algimantas P. Urbutis, Palos Heights, Ill.

[73] Assignee: Viskase Corporation, Chicago, Ill.

[21] Appl. No.: 929,455

[22] Filed: Nov. 12, 1986

[51] Int. Cl.$^4$ ............................................ A22C 11/00
[52] U.S. Cl. ........................................................ 17/41
[58] Field of Search .................... 17/41, 42, 33, 34, 49

[56] References Cited

U.S. PATENT DOCUMENTS 4,521,938  6/1985  Kupcikevicius .................... 17/41 X Primary Examiner—Willie G. Abercrombie
Attorney, Agent, or Firm—Roger Aceto

[57] ABSTRACT

A clamp for attaching a shirred casing article, to a stuffing machine. The casing article includes a shirred casing carried on a disposable sleeve and the clamp comprises a plurality of radially movable elements arranged circumferentially about an end of the sleeve. The elements are driven by a cam which rotates about the longitudinally axis of the sleeve such that rotation in one direction presses the elements radially inward against the sleeve and rotation in an opposite direction moves the elements radially away from the sleeve.

10 Claims, 7 Drawing Figures

CLAMP MEANS FOR A STUFFING MACHINE

FIELD OF THE INVENTION

The present invention relates to a means for clamping a disposable sleeve and/or casing article to a stuffing machine.

BACKGROUND OF THE INVENTION

A stuffing machine as described in U.S. Pat. No. Re. 30,390 includes a support sleeve which is slidably disposed about the stuffing horn of the machine. The structure and function of the sleeve are well known and reference is made to U.S. Pat. No. Re. 30,390 for a more detailed description thereof. For purposes of the present invention, it is sufficient to say that the sleeve as described in U.S. Pat. No. Re. 30,390 is intended to be a permanent structural element of the stuffing machine. The sleeve is disposed around the stuffing horn and has one end attached to a mechanism for moving the sleeve longitudinally along the horn.

In use, a shirred casing stick, which has a bore diameter larger than the outside diameter of the sleeve, is positioned on the sleeve so the fore end of the sleeve extends through the bore of the shirred stick. A casing sizing means is then detachably secured to the fore end of the sleeve. Since the sizing means is attached to the sleeve, movement of the sleeve along the horn will move the sizing means. As is known in the art, such movement of the sizing means may be used to provide the slack casing as may be needed for gathering and closing about the ends of the stuffed product or to control the diameter of the stuffed product. As disclosed, for example in U.S. Pat. No. Re. 30,390, slack casing is provided by moving the sleeve in short quick strokes back and forth along the horn, and stuffed diameter is controlled by adjusting the space between the sizing means and an external casing contacting member.

In certain recent food stuffing systems, the shirred casing stick and a sizing means or disk have been placed on a disposable sleeve by the casing manufacturer. The disposable sleeve with its sizing means and supply of shirred casing are attached to the stuffing machine and then, after the casing supply on the sleeve is exhausted, the sleeve is removed and discarded.

One advantage of having the casing manufacturer place shirred casing on a disposable sleeve equipped with a sizing means is that the user can be supplied with a greater length of casing than if a permanently mounted sleeve is used. This is because with a permanent sleeve, the bore of the shirred casing must be large enough to easily slide over the sleeve. However, when the shirred casing is placed on a disposable sleeve by the casing manufacturer, the clearance between the shirred casing and the sleeve is reduced or eliminated entirely. Thus, the clearance space otherwise needed for the shirred stick to slip onto a permanent sleeve of the stuffing machine is occupied instead by some quantity of shirred casing.

When a disposable sleeve is used, the stuffing machine must be equipped with means for releasably connecting the disposable sleeve to the stuffing machine. For example, U.S. Pat. Nos. 4,521,938 and 4,570,292 disclose disposable sleeves equipped with various configurations of male or female connector elements for joining to a mating connector on the stuffing machine.

The combined weight of a commercially employed casing article comprising the shirred casing and disposable sleeve may be in excess of ten pounds. Also, the pulling force of the casing passing over the sizing means can be sixty pounds or more. Accordingly, the connection holding the disposable sleeve to the stuffing machine must be strong enough to prevent a premature separation during use as the casing passes over the sizing means during stuffing, and as the casing article is moved in short quick strokes to provide slack casing. On the other hand, the connection must be made and separated quickly and easily so that an operator can connect or disconnect the sleeve at will. For example, a minimum time period should be taken to remove a disposable sleeve after the casing supply is spent and to replace it with a new sleeve containing a full supply of shirred casing.

In the present invention the stuffing machine is provided with a clamp that is operable to attach quickly and easily to an end of the disposable sleeve of the casing article. In particular, the clamp of the present invention has a plurality of radially movable elements disposed in a plane transverse to the longitudinal axis of the stuffing horn. In one embodiment of the invention there is a snap fit engagement between the disposable sleeve and the clamp. When the operator desires to release the sleeve, the radially movable elements are pressed inwardly against the sleeve to force the sleeve from its snap fit engagement with the clamp.

In another embodiment the radially movable elements press inwardly and clamp against the sleeve to hold the sleeve to the stuffing machine. Moving the elements outwardly and away from the sleeve releases it from the clamp.

SUMMARY OF THE INVENTION

The present invention may be characterized in one aspect thereof by a stuffing machine including a bed, a stuffing horn supported above the bed and having a forward discharge and a rearward inlet, and clamp means on said stuffing machine for releasably attaching to an end of a sleeve which is slidably mountable on the stuffing horn, said clamp means comprising:

(a) a frame including front and rear plates joined in a face-to-face spaced apart relationship so as to form a space therebetween, said plates being disposed transverse to the longitudinal axis of the stuffing horn with each plate having a circular passageway radially aligned to accommodate the stuffing horn, and said front plate passageway having a diameter sufficient to admit a said sleeve end into said space between said plates;

(b) a plurality of pressing elements disposed in said space between said plates and circumferentially positioned about a said sleeve end, said pressing elements each being guided for sliding movement relative to said plates to and from a first position spaced radially outward from a said sleeve end and a second position pressed inwardly against a said sleeve end;

(c) a driven member in said space between said plates, and said driven member being journaled to one of said plates for rotary motion about the longitudinal axis of said stuffing horn through a defined arc length;

(d) drive means carried by said frame and connected to said driven member for alternately rotating said driven member clockwise and counterclockwise through said arc length; and (e) linking means between said driven member and each of said pressing elements for slidably moving said elements between said first and second positions responsive to the clockwise and counterclockwise rotation of said driven member.

DESCRIPTION OF THE PREFERRED EMBODIMENT

Figure 1:
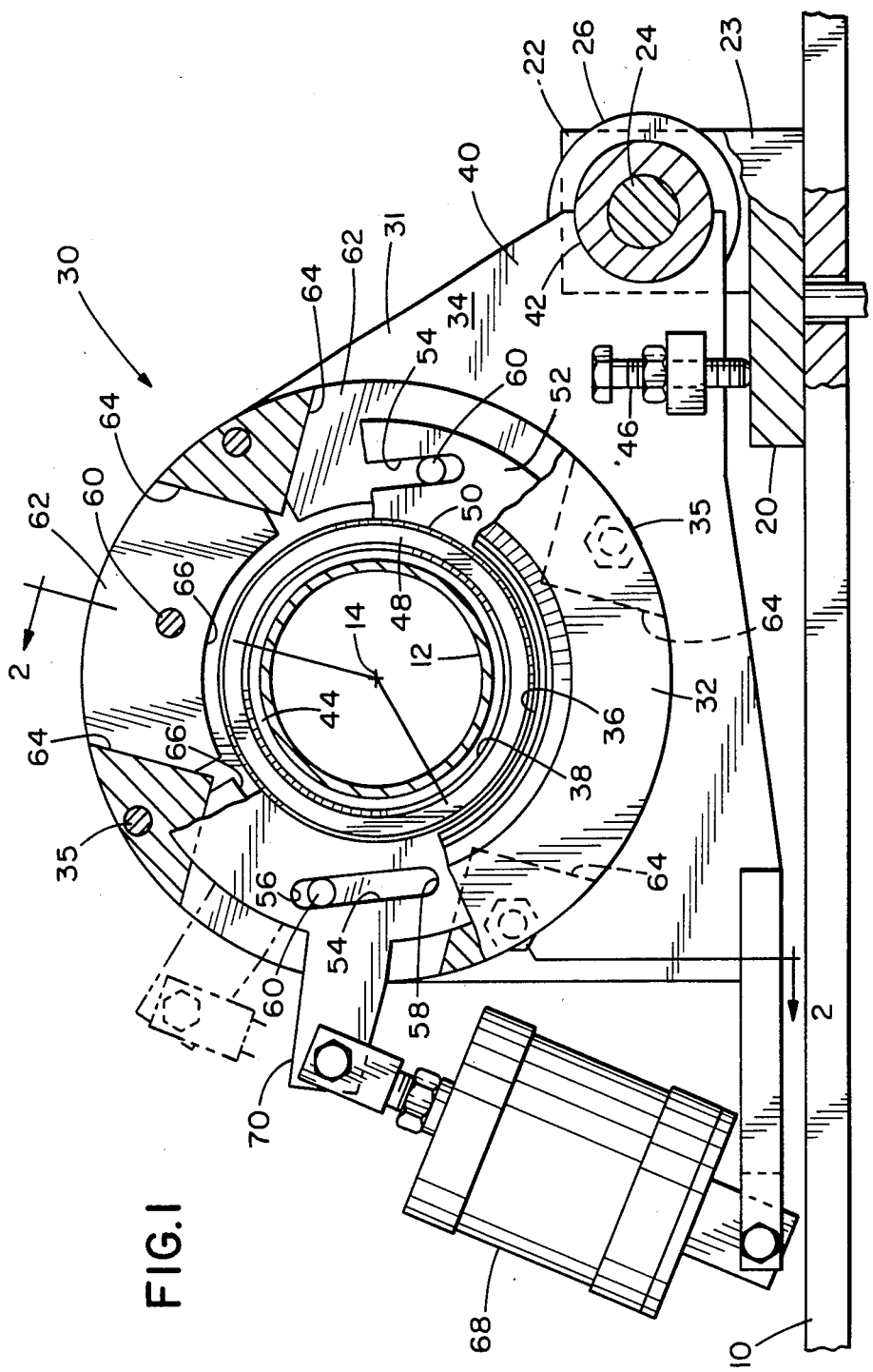
FIG. 1 is a front elevation view of the clamp means of the present invention in place about the stuffing horn and with portions of the clamp means broken away and in section.
Figure 2:
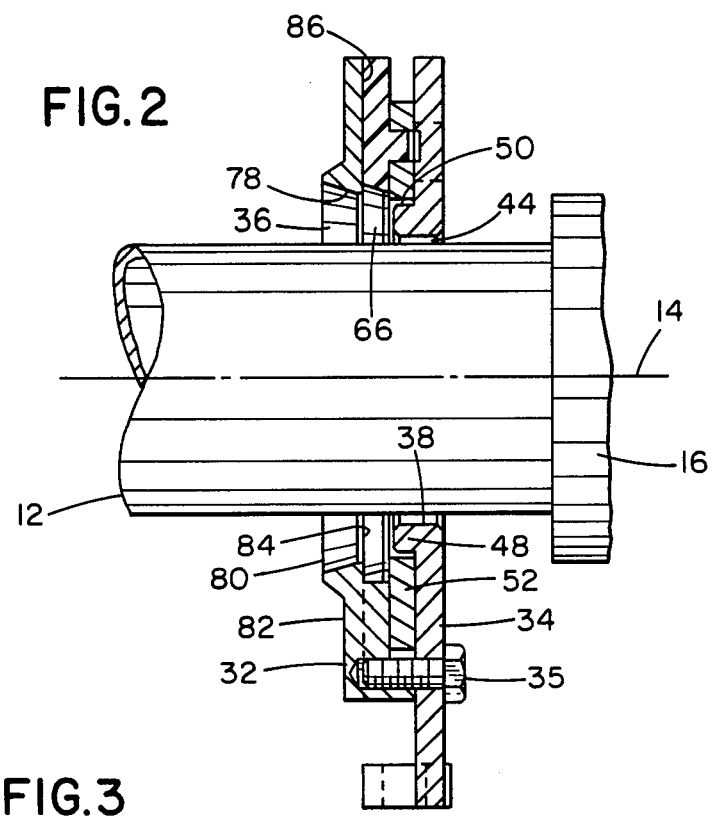
FIG. 2 is a view taken generally along lines 2—2 of FIG. 1.

Referring to the drawings, FIG. 1 shows a portion of a stuffing machine bed 10. Supported above the bed is a stuffing horn 12. As shown in FIG. 2, the stuffing horn 12 has a longitudinal axis 14 and an inlet end 16. The outlet end (not shown) of the stuffing horn is oriented forward or to the left as shown in FIG. 2.

Figure 3:
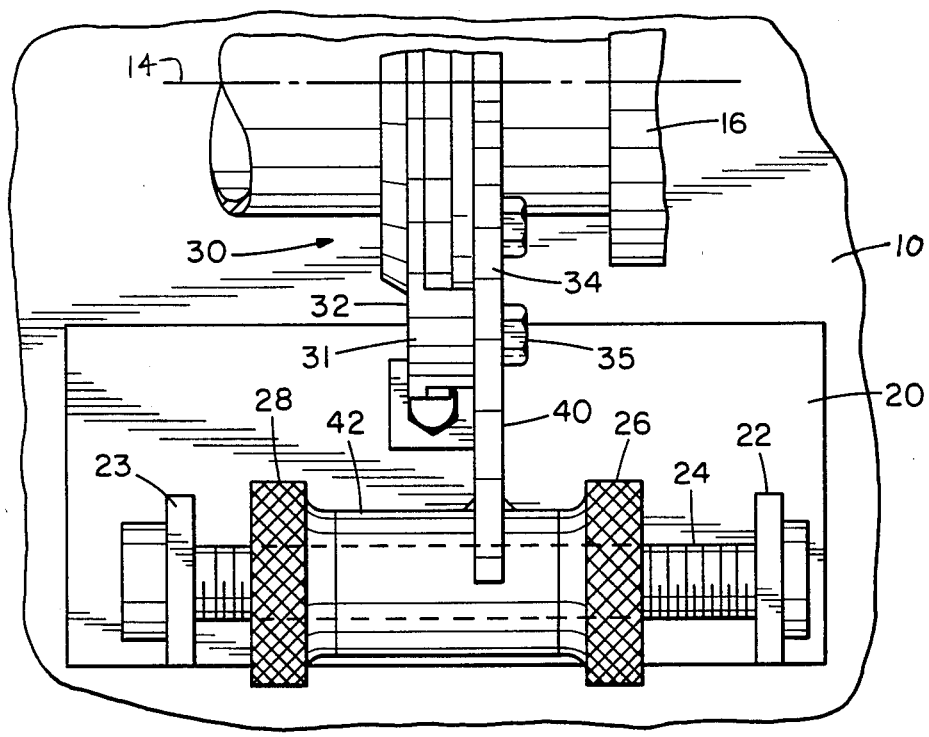
FIG. 3 is a plan view of FIG. 1 showing the attachment of the clamp means to the stuffing machine.

As best shown in FIGS. 1 and 3, the machine bed 10 carries a slide 20 adjacent the stuffing horn inlet end 16.

Briefly, slide 20 is movable on the stuffing machine bed 10 along a path parallel to the longitudinal axis 14 of the stuffing horn. In operation, the slide is driven by any suitable means (not shown) in short, quick reciprocating strokes (three inches or less) at predetermined times in the stuffing cycle. Slide 20 has a pair of upstanding end pieces 22, 23 which support the ends of a threaded shaft 24. A pair of knurled nuts 26, 28 are threadably adjustable along shaft 24. The clamp means of the present invention generally indicated at 30 is attached to the slide 20 by an outrigger portion 40 captured between nuts 26, 28 as further set out hereinbelow.

Clamp means 30 is disposed adjacent the stuffing horn inlet 16 and includes a radially outwardly extending frame 31 having two plates; a front plate 32 oriented toward the discharge end of the stuffing horn and a rear plate 34. The plates are joined by any suitable means, such as bolts 35, in a face-to-face spaced apart relationship and are disposed transverse the stuffing horn longitudinal axis 14.

Each plate 32, 34 has a circular passageway 36, 38 respectively (FIGS. 1 and 2) which are radially aligned to accomodate stuffing horn 12. The front plate passageway 36 is larger in diameter than rear plate passageway 38 to admit one end of a sleeve (not shown) through the front plate.

In order to connect clamp means 30 to slide 20 as set out hereinabove, the outrigger portion 40 of rear plate 34 terminates at a bushing 42 (FIGS. 1 and 3). The threaded shaft 24 of slide 20 extends through the bushing and is captured between knurled nuts 26, 28. By this arrangement clamp means 30 is captured to the slide and moves longitudinally in concert with the slide as the slide is reciprocated.

While clamp means 30 moves longitudinally with slide 20, bushing 42 allows the clamp means to pivot about shaft 24 in a plane transverse the longitudinal axis 14 of the stuffing horn so that the passageways 36, 38 can be positioned concentrically with respect to the stuffing horn. A concentric position will establish a substantially annular clearance space 44 (FIGS. 1 and 2) between the plates 32, 34 and the stuffing horn. Such a clearance space 44 is important in order to facilitate entry of an end of a disposable sleeve through passageway 36 and to prevent dragging of the rear plate 34 along the stuffing horn.

To adjust the transverse position of plates 32, 34, the rear plate 34 carries an adjustable leveling screw 46 (FIG. 1) which bears against slide 20. Turning the screw will pivot the frame 31 about shaft 24 to adjust and hold a transverse position of the frame relative to the stuffing horn.

Extending in a forward direction from rear plate 34 is a journal 48 (FIGS. 1 and 2). Journal 48 defines an annular bearing surface 50 for rotatably supporting a flat ring 52. The ring can be rotated about the longitudinal axis of the stuffing horn.

As best seen in FIG. 1, the ring 52 has a plurality of elongated slots 54 arranged so that one end 56 of each slot lies farther from bearing surface 50 than the second end 58 of each slot. Extending into each slot is a pin 60. Each pin, in turn, is fixed to a pressing element 62 which is guided for sliding radial movement by guide ways 64 formed in the front plate 32. With this arrangement, pins 60 and slots 54 provide means for linking each of the pressing elements 62 to ring 52. Moreover, it should be appreciated that pins 60 and slots 54 comprise cooperating cam means for driving pressing elements 62 radially inwardly and outwardly. In this respect, when ring 50 is in the position as shown in FIG. 1, pins 60 are located at the end 56 of each slot so that the pins, and therefore the pressing elements 62, are spaced outwardly from the bearing surface 50. However, if ring 52 is rotated clockwise as viewed in FIG. 1, pins 60, and therefore pressing elements 62, move radially inwardly until the pins reach the second end 58 of each slot. Thereafter, a counterclockwise rotation of ring 52 will restore the ring, the pins 60, slots 54 and elements 62 to their respective positions shown in FIG. 1.

Ring 52 is a driven member and the drive means for driving ring 52 alternately clockwise and counterclockwise about the bearing surface 50 includes a pneumatic cylinder 68. Cylinder 68 is carried by rear plate 34 and is operatively connected to a crank arm 70 extending from ring 52. With this arrangement, operation of the pneumatic cylinder will rotate the ring through a defined arc length from and between the position shown in solid line in FIG. 1, and the position shown in phantom line.

Each pressing element 62 has an inner peripheral surface 66 which is arcuate in a plane transverse the stuffing horn longitudinal axis 14. The arcuate surfaces 66 are disposed and arranged so that when the elements 62 are moved to their innermost position, the surfaces 66 come substantially together and define a substantially closed circle. For purposes further set out hereinbelow, the diameter of this closed circle is smaller than the outside diameter of the end of a disposable sleeve inserted into the front plate passageway 36.

FIGS. 4–7 show at 72 only an end portion of a disposable sleeve disposed about the stuffing horn 12 and attached to clamp means 30. As set out hereinabove, the sleeve forms no part of the present invention and reference is made to copending application Ser. No. 900,573 filed Aug. 26, 1986 for a more detailed description of a preferred sleeve. A preferred sleeve is made of a plastic material and is disposable after a single use. Extending from the end portion of the sleeve is a circular lip 74, which defines the end of the sleeve releasably connectable to the clamp means. The lip is larger in diameter than the sleeve end portion 72 so as to form an external shoulder 76 at the juncture of the lip and the end portion.

Figures 4, 5:
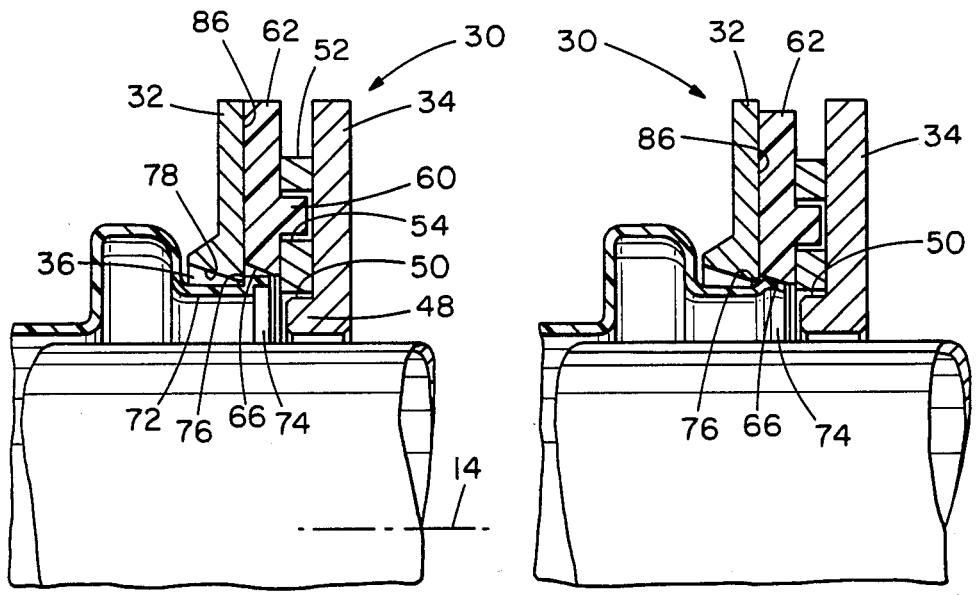
FIG. 4 is a view, on an enlarged scale, of a portion of FIG. 2 showing components of the clamp means connected to one end of a disposable sleeve.
FIG. 5 is a view similar to FIG. 4 showing components of the clamp means in position to release the sleeve.

In the embodiment of FIGS. 4 and 5, the shoulder 76 of the sleeve is snap-connected to the clamp means 30 when the lip 74 is forcibly entered into passageway 36. In this respect, the passageway 36 in the front plate is defined by an annular wall 78 (FIG. 2) which tapers outwardly toward the forward, or discharge end of the stuffing horn. This provides a passageway having a first opening 80 through the forward facing surface 82 of the front plate which is larger in diameter than a second opening 84 through the rearward facing surface 86 of the front plate.

The second opening 84 is smaller in diameter than the outside diameter of lip 74 so that as the end portion 72 of the sleeve is forced through passageway 36, the lip is radially contracted by surface 78 until it passes completely through passageway 36. At this point the contracted lip expands resiliently and thereby snap fits, and locks, shoulder 76 against the rearward facing surface 86 of the front plate as shown in FIG. 4. This snap fit engagement, which is continuous about the entire circumference of the sleeve, is sufficient to hold the sleeve to the clamp means 30 as the clamp means is moved rearwardly (to the right as viewed in FIGS. 4 and 5) during reciprocation of the slide 20.

In order to reduce or eliminate completely any undesired play or lost motion between the clamp means and the sleeve during the reciprocation of the clamp means, the inner peripherial surface 66 of each sliding element is tapered as shown in the figures so that the lip can be captured between this tapered surface 66 and the rearwardly facing surface 86 of the front plate.

When the operator desires to remove the sleeve, pneumatic cylinder 68 is operated to rotate ring 52 in a clockwise direction to the position shown in dotted line in FIG. 1. Upon this rotation of the ring 52, the cam action of slots 54 drives pins 60 inwardly towards the stuffing horn longitudinal axis 14. This, in turn, slides each of the pressing elements 62 from the position shown in FIGS. 1 and 4, to the position shown in FIG. 5. In the FIG. 5 position, the arcuate inner peripherial surfaces 66 of the pressing elements form substantially a closed circle which is smaller in diameter than lip 74. Consequently, the elements 62 press inwardly on the lip and contract it so that shoulder 76 becomes disengaged from behind the rear facing surface 86 of front plate 32. When this occurs, the sleeve can be removed from the clamp means 30.

The tapered configuration of the arcuate surfaces 66 facilitates removal of the sleeve by causing the sleeve to eject in a forward direction as the shoulder 76 clears from behind the rear facing surface 86 of the front plate.

Figures 6, 7:
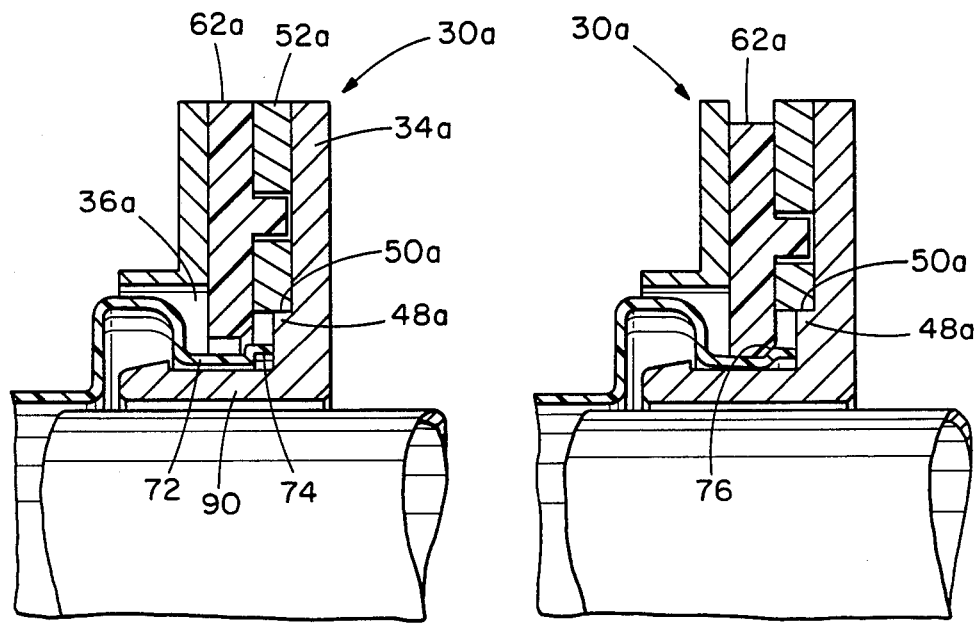
FIGS. 6 and 7 are similar to FIGS. 4 and 5 respectively showing another embodiment of the invention.

The embodiment of the clamp means as shown in FIGS. 6 and 7 is substantially the same as that illustrated in FIGS. 1-5 except that in FIGS. 6 and 7 a sleeve is held to the clamp means by sliding the pressing elements 62 inwardly and pressing them against the sleeve. This is opposite to the movement in the embodiment of FIGS. 4 and 5 wherein pressing the elements 62 inwardly against the sleeve acts to release the sleeve from the clamp means. In describing the embodiment of FIGS. 6 and 7, those components which are the same, or which perform the same function, as the embodiment of FIGS. 1-5 are identified by the same reference numeral with the letter "a" appended thereto. The sleeve is identical to the sleeve shown in FIGS. 4 and 5 so the letter "a" is not appended to components of the sleeve.

As shown in FIGS. 6 and 7, the front plate passageway 36a is relatively large in diameter to permit the free entry of the end portion 72 of the sleeve. The rear plate 34a has a journal 48a which defines a bearing surface 50a for rotatably supporting ring 52a. In addition, it has an annular collar 90 extending in a forward direction from journal 48a and into the front plate passageway 36a. When the end portion 72 enters the front plate passageway 36a, it is received about the collar 90 as shown in FIG. 6 wherein the lip 74 of the sleeve butts against the journal 48a.

After the end portion 72 of the sleeve reaches the position shown in FIG. 6, the pneumatic cylinder 68 (FIG. 1) is operated to rotate ring 52a clockwise. As described hereinabove, this rotation drives pressing elements 62a inwardly and presses them against the sleeve. This pressing action serves to clamp the end portion 72 of the sleeve to the collar 90.

The holding force of the clamp means 30 during the rearward movement phase of slide reciprocation is improved by locating the end portion of the sleeve so that the clamping action occurs in front of lip 74. This is shown in FIG. 7 wherein shoulder 76 is captured behind the pressing elements 62a.

Changes in the structure of the components of the clamp means 30a needed to permit the entry of the end portion 72 of the sleeve to the position shown in FIGS. 6 and 7 will be readily apparent to one skilled in the art. For example, the longitudinal width of journal 48a can be decreased so that the lip 74 can be inserted beyond the sliding elements 62a. It also is preferred that the lip 74 butt up against journal 48a when the pressing elements 62a are in the clamping position shown in FIG. 7. This will reduce or eliminate completely any undesirable play or lost motion between the sleeve and clamp means 30a during the reciprocation of the clamp means.

When the operator desires to remove the sleeve, pneumatic cylinder 68 (FIG. 1) is operated to rotate ring 52a counterclockwise. This returns the pressing elements 62a to the position shown in FIG. 6 and completely frees the sleeve from the clamp means so that the sleeve can be pulled forward and removed from the stuffing horn.

Having thus described the invention in detail what is claimed as new is:

1. A stuffing machine including a bed, a stuffing horn supported above the bed and having a forward discharge and a rearward inlet, and a clamp means on said stuffing machine for releasably attaching to an end of a sleeve which is slidably mountable on the stuffing horn, said clamp means comprising:
   (a) a frame including front and rear plates joined in a face-to-face spaced apart relationship so as to form a space therebetween, said plates being disposed transverse to the longitudinal axis of the stuffing horn with each plate having a circular passageway radially aligned to accomodate the stuffing horn, and said front plate passageway having a diameter sufficient to admit a said sleeve end into said space between said plates;

(b) a plurality of pressing elements disposed in said space between said plates and circumferentially positioned about a said sleeve end, said pressing elements each being guided for sliding movement relative to said plates to and from a first position spaced radially outward from a said sleeve end and a second position pressed inwardly against a said sleeve end;

(c) a driven number in said space between said plates, said driven member being journaled to one of said plates for rotary motion about the longitudinal axis of said stuffing horn through a defined arc length;

(d) drive means carried by said frame and connected to said driven member for alternately rotating said driven member clockwise and counterclockwise through said arc length; and (e) linking means between said driven member and each of said pressing elements for slidably moving said pressing elements between said first and second positions responsive to the clockwise and counterclockwise rotation of said driven member.

2. A stuffing machine as in claim 1 wherein said front plate passageway is defined by an annular wall which tapers outwardly toward the discharge end of the stuffing horn, and wherein a first opening of said passageway through the forward facing surface of said front plate is larger in diameter than a second opening of said passageway through the rearward facing surface of said front plate, and said second opening being smaller in diameter than a said sleeve end to permit a snap fit engagement of a said sleeve end against said rearward facing surface of said front plate upon forcible passage of a said sleeve end through said second opening and into said space.

3. A stuffing machine as in claim 2 wherein said pressing elements each have a radially inward edge which is arcuate in a plane transverse to the longitudinal axis of the stuffing horn with said edges being pressable against a said sleeve end in said space, and said edges at said second position defining a substantially closed circle having a diameter smaller than the diameter of said second opening, whereby a said sleeve end in said space is uniformly contracted radially and released from its snap fit engagement with said rearward facing surface.

4. A stuffing machine as in claim 1 wherein said front plate has a plurality of radial guide channels and one of said pressing elements is slidably disposed in each of said channels.

5. A stuffing machine as in claim 1 wherein said linking means comprises cooperating cam members on said driven member and said slidable elements.

6. A stuffing machine as in claim 5 wherein said cam members include cam surfaces on said driven member and a cam follower on each of said pressing elements contacting said cam surfaces.

7. A stuffing machine as in claim 1 including:
(a) a shaft supported on said bed and oriented parallel with the longitudinal axis of the stuffing horn;
(b) a bushing on said frame and said shaft extending through said bushing such that said frame is pivotable about said shaft in a direction transverse to the longitudinal axis of the stuffing horn; and
(c) stops on said shaft to prevent longitudinal movement of said bushing relative to said shaft.

8. A stuffing machine as in claim 7 including adjusting means on said frame for adjusting the position of said frame in a transverse direction relative to said stuffing horn to orient and maintain said openings concentric to said stuffing horn and thereby provide a clearance space between said frame and stuffing horn which extends completely around said stuffing horn.

9. A stuffing machine as in claim 8 including:
(a) a slide movable on said bed along a path parallel to the longitudinal axis of the stuffing horn;
(b) said shaft being carried by said slide; and
(c) said adjusting means is a leveling screw carried by said frame and contacting said slide.

10. A stuffing horn as in claim 1 including:
(a) a collar disposed about said stuffing horn, said collar being fixed to said rear plate and extending in a forward direction through said front plate passageway;
(b) said collar and front plate defining an annular opening therebetween for receiving a said sleeve end which is entered into said annular opening and over said collar; and
(c) said pressing elements at said second position being pressable against a said sleeve end for clamping the same to said collar.

* * * * *